3,155,656
NOVEL PROCESS FOR N-ALKYLMORPHOLINES

Roland H. Goshorn, Fort Washington, and Richard Ferren, Ambler, Pa., and Herbert O. Smith, Trenton, N.J., assignors to Pennsalt Chemicals Corporation, Philadelphia, Pa., a corporation of Pennsylvania
No Drawing. Filed Apr. 14, 1960, Ser. No. 22,109
7 Claims. (Cl. 260—247)

This invention relates to a novel process for the preparation of certain N-alkylmorpholines which compounds are useful as surfactants and as catalysts for curing polyurethane foams. More particularly, this invention deals with a process for making N-alkylmorpholines having the structure

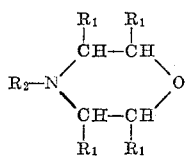

where the $R_1$ groups represent hydrogen or methyl radicals and the $R_2$ radical is a lower alkyl group, which process comprises reacting a lower alkyl amine with the appropriate bis(2-chloroalkyl) ether.

N-alkylmorpholines have been prepared most commonly by dehydration of an N-alkyldiethanolamine or by condensation of a primary amine with bis(2-chloroethyl) ether. In the latter process (over which this invention is an improvement) a strong basic catalyst such as an alkali metal hydroxide or carbonate is usually used and the process is frequently carried out in an aqueous or organic solvent system (see for example, J.A.C.S. 76 3589 (1954)). Because of the presence of water or solvent, isolation of the N-alkylmorpholine from the reaction mass requires several steps and this handling is costly and uneconomical. Furthermore, the use of strong alkaline catalysts complicates the process from the standpoints of equipment and handling hazards.

It has now been found quite unexpectedly that the class of N-alkylmorpholines of the above structure may be readily obtained in good yield in the absence of catalyst, in the absence of aqueous or organic solvent media, and without cumbersome isolation techniques by the novel process of this invention which comprises reacting at least 3 moles of a lower alkyl primary amine with one mole of a bis(2-chloroalkyl) ether containing from four to eight carbon atoms, holding the reaction mass at a temperature sufficient to melt the alkylamine hydrochloride formed for a time sufficient to permit separation of the products into two liquid layers, and physically separating the N-lower alkyl morpholine. The chemistry of the process is illustrated by the following equation:

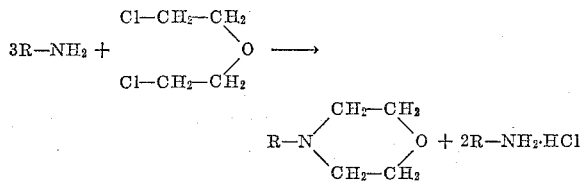

In carrying out this novel process the lower alkyl amine and bis(2-chloroalkyl) ether are first simply mixed and reacted with agitation at an elevated temperature, usually between about 75° C. and about 200° C. depending upon the particular amine and ether employed. Preferably, in order to avoid by-products and attendant low yields, the amine is added to the ether. After the reaction is completed, agitation is stopped and the temperature is raised to ensure that the amine hydrochloride formed during the reaction is molten. The reaction mass is held at this temperature for a time sufficient to permit separation of the two liquid layers (i.e. the N-alkyl morpholine product and the amine hydrochloride by-product). The time sufficient for separating the liquid layers will, of course, depend upon the difference in densities between the morpholine product and the amine salt. However, the completeness of the separation is easily determined by visual observation of a sample of the reaction mass. When judged complete, the two layers are then mechanically separated by gravity flow, decantation, or the like. If desired, the product N-alkyl morpholine may be distilled to obtain a higher quality material.

It will, of course, be understood that the temperature at which the reaction mass is held during the separation of the two liquid phases will depend upon the particular amine used and the corresponding amine hydrochloride formed. The amine hydrochloride in the reaction mass will liquefy at a temperature somewhat below its actual melting point due to the heterogeneity of the system. Accordingly, it may be expected that the minimum temperature required for maintaining the reaction products liquid for their separation will be about 5° to 25° C. below the melting point of the pure amine hydrochloride. The following table lists the melting points of various amine hydrochlorides and will serve as a guide to actual temperatures that may be used for specific reactants:

TABLE I

| Amine: | Melting point of amine hydrochloride, °C. |
|---|---|
| Methylamine | 226–228 |
| Ethylamine | 108–109 |
| n-Propylamine | 157–158 |
| Isopropylamine | 154 |
| n-Butylamine | 195 |
| Isobutylamine | 178 |
| Isoamylamine | 216–217 |

The process of this invention may be carried out at atmospheric or superatmospheric pressures depending upon the choice of reactants. If the bis(2-chloroalkyl) ether or amine are low boiling and may be lost by volatilization, or if the amine hydrochloride melts at a relatively high temperature, pressure systems may advantageously be employed. Thus, for example, when using methylamine a closed system will be employed and a superatmospheric pressure will be generated. Where practical, of course, reaction systems at atmospheric pressure will be preferred.

The ratio of reagents used is important if optimum yields are to be obtained. As can be seen from the reaction equation, the stoichiometric ratio of alkylamine to bis(2-chloroalkyl) ether is 3:1. It is found in practice that the yield suffers significantly when amounts of reagents are used having less than this ratio. On the other hand, a ratio of 12:1 is no better than 6:1 and for most practical purposes a ratio of from 3:1 to 5:1 will be preferred.

As indicated above, the alkylamines which are used in this process are lower alkyl primary amines, i.e. those containing from one to about six carbon atoms per alkyl group.

The bis(2-chloroalkyl)ether which may be used will be a β,β'-dichloro ether, but it will be understood that this ether derivative may have substituents on its carbon atoms. Preferably, these substituents will be lower alkyl radicals. Thus the preferred useful bis(2-chloroalkyl) ethers will include bis(2-chloroethyl) ether, bis(2-chloroisopropyl) ether, bis(2-chloro-n-propyl) ether, bis(2-chloro-sec-butyl) ether, and the like.

A major advantage of this process is the formation of two liquid layers which makes it conducive to an economical continuous or semi-continuous process. Such a continuous process is obtained readily by carrying out the reaction in a heated pipe through which the reagents and products flow into a heated hold-tank and from which the top layer product of N-alkylmorpholine is directly obtained by continuous or intermittent withdrawal. Use of such a continuous process together with recovery of the alkylamine from its hydrochloride which is formed, makes the process of this invention particularly economical and desirable.

The following examples will further illustrate this invention.

*Example 1 (LNB–1710–81)*

To 572 g. (4 moles) of bis(2-chloroethyl) ether held at 100° to 110° C. there is added with stirring during a five hour period 540 g. (12 moles) of ethylamine. Stirring is then stopped and the temperature is maintained at 80° to 90° C. as the liquids are allowed to separate and form two layers. The upper layer is siphoned off and distilled to yield 322.5 g. (68% yield) of N-ethyl-morpholine, B.P. 130–153° C., purity 97%.

*Example 2*

To a one gallon autoclave, equipped with a stirrer and an internal well pipe extending from the bottom is added 9 moles (1187 g.) of bis(2-chloroethyl) ether. The autoclave is sealed and 27 moles (810 g.) of methylamine is then pressured in. The stirrer is started and the reaction mixture is heated at 100° C. for five hours and then the reaction mass is heated rapidly to 210° C. The stirrer is stopped and the temperature is held at 200–210° C. for 15 minutes to allow separation of the molten amine hydrochloride from the N-methylmorpholine. The autoclave is then discharged through the well pipe, the amine hydrochloride layer being collected in one container and the N-methylmorpholine layer in another. The N-methylmorpholine layer is fractionated and collected at 110° to 125° C.

*Example 3*

2,6-dimethyl-N-methylmorpholine is prepared in the same manner as N-methylmorpholine (Example 2) using bis(2-chloroisopropyl) ether instead of bis(2-chloroethyl) ether.

*Example 4*

A mixture of 878 g. (12 moles) of n-butylamine and 572 g. (4 moles) of bis(2-chloroethyl) ether is reacted as in Example 2, the reaction mixture being heated to about 200° C. to obtain layer separation of molten butylamine hydrochloride. On distillation of the N-n-butylmorpholine layer the main cut is N-n-butylmorpholine distilling at 160–184° C.

*Example 5*

Following the procedure of Example 2, a 3:1 molar mixture of isopropyl amine and bis(2-chloroethyl) ether is reacted at 100° C. Layer separation is obtained by holding the temperature at 145° to 150° C. and the N-isopropylmorpholine is separated and purified by distillation.

It will be understood that many variations in the above procedures may be made without departing from the spirit and scope of this invention and accordingly, the invention is not to be limited by the above description and examples.

We claim:

1. A process for the preparation of an N-lower alkyl morpholine having the structure

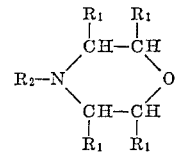

where $R_1$ is a member selected from the group of hydrogen and methyl and $R_2$ is lower alkyl which comprises adding at least three moles of a lower alkyl primary amine to one mole of a bis(2-chloroalkyl) ether containing from four to eight carbon atoms and reacting said amine with said ether at a temperature between about 75° and about 200° C., holding the product reaction mass at a temperature between about 83° C. and 223° C. to liquefy the alkylamine hydrochloride formed until separation of the products into two liquid layers occurs, and physically separating the N-lower alkylmorpholine.

2. The process of claim 1 wherein the primary alkyl amine is methylamine and the bis(2-chloroalkyl) ether is bis(2-chloroethyl) ether.

3. The process of claim 1 wherein the amine is ethylamine and the ether is bis(2-chloroethyl) ether.

4. The process of claim 1 wherein the ether is bis(2-chloroisopropyl) ether.

5. The process of claim 1 wherein the amine is butylamine.

6. The process of claim 1 wherein the amine is propylamine.

7. The process of making N-ethyl morpholine which comprises reacting at atmospheric pressure one mole of bis(2-chloroethyl) ether with at least three moles of ethylamine, holding the reaction mass at a temperature between 80° C. and 90° C. until the two liquid layers separate and mechanically separating the N-ethylmorpholine.

References Cited in the file of this patent

UNITED STATES PATENTS

| 2,692,879 | Hales | Oct. 26, 1954 |
| 2,694,707 | Erickson | Nov. 16, 1954 |

FOREIGN PATENTS

| 474,671 | Great Britain | Oct. 29, 1937 |
| 516,943 | Canada | Sept. 27, 1955 |